Nov. 4, 1958    J. D. ROSE    2,859,033
CONSTANT FORCE APPLYING MECHANISM
Filed June 27, 1956

James D. Rose,
INVENTOR.

BY,

ATTORNEY.

United States Patent Office 2,859,033
Patented Nov. 4, 1958

2,859,033

CONSTANT FORCE APPLYING MECHANISM

James D. Rose, Canoga Park, Calif., assignor to Hughes Aircraft Company, Culver City, Calif., a corporation of Delaware Application June 27, 1956, Serial No. 594,315

7 Claims. (Cl. 267—1)

The present invention relates generally to a constant force loading arrangement and relates more particularly to a means for maintaining a constant force on such items as ball or roller bearing races, and the like. The present device is operable under varying environmental conditions.

In various mechanical mechanisms, it is often important that devices such as roller bearings, and the like, have a constant force applied thereto. Not only must this force be operable under varying environmental conditions, such as temperature changes, etc., but must also be effective to apply a high loading factor when large short duration forces are applied to bearing members, to permit deformation with continued maintenance of the proper loading force when long duration forces are applied thereto. Heretofore, attempts at accomplishment of these ends have been made through the use of metallic springs of various types such as leaf springs, coil springs and the like. Additionally, hydraulically or pneumatically operated arrangements have been employed for these purposes. In all prior instances, the constant force loading arrangements have failed to provide the precise forces desired and have been completely ineffective for use in situations wherein varying duration forces have been applied to the structure that is biased by the springs.

It is, therefore, one important object of this invention to provide a constant force maintaining structure that is effective over a wide range of temperature conditions and which possess a feature of resisting short duration forces while permitting deformation under long duration forces.

Another object of the invention is to provide a mechanism for maintaining a constant force on bearing components, or the like.

A further object of the invention is to provide a novel spring arrangement for use in biasing one element in regard to another and wherein a non-newtonian fluid is employed to provide a resistance to spring movement under short duration force application.

Still another object of the invention is to provide a constant rate spring arrangement wherein the rate of deformation is maintained with such a constant value only when long duration forces are applied thereto.

Other and further important objects of the invention will become apparent from the disclosures and the following detailed specification, appended claims and accompanying drawing, wherein:

Figure 1:
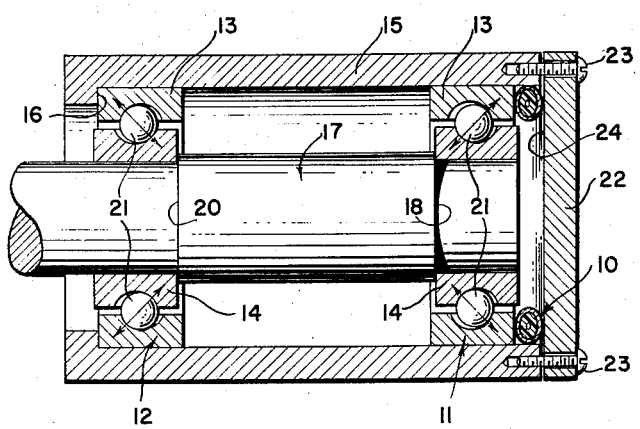
Figure 1 is a transverse sectional view of a bearing mounted shaft and housing therefor, showing a typical application of the present force maintaining arrangement.

With reference to the drawing, the mechanism for maintaining a constant force is shown as indicated generally at 10 and in use typically with a pair of thrust bearings 11 and 12. The bearings 11 and 12 have outer races 13 and inner races 14, the outer races 13 being disposed within the cylinder 15. The cylinder 15 has a shoulder 16 adjacent one end thereof with the outer race 13 of the bearing 12 being abutted against the shoulder 16. The inner races 14 of the bearings are adapted for cooperation with a shaft 17 having a pair of shoulders 18 and 20 against which the inner races 14 are positioned. As shown in an exaggerated manner in Fig. 1, the forces which must be applied to balls 21 of the bearings, act at an angle, as illustrated by the arrows drawn through the axes of the balls.

In order that the balls 21 may be maintained in constant force relationships with regard to the races 13 and 14, it is important that constant force be applied to the outer race 13 of the bearing 11, with this force being transmitted to the balls 21, to the inner race 14 of the bearing 11 and through the shaft 17 to the inner race 14 of the bearing 12. The balls 21 of the bearing 12 serve to transmit this force to the outer race 13 of this bearing and to the cylinder 15 by way of the shoulder 16. Heretofore, a spring or the like, has been used to apply the force necessary in this typical instance.

As shown in Fig. 1, the mechanism 10 is disposed between the outer race 13 of the bearing 11 and a thrust plate 22 that is secured to the cylinder 15 by means of screws 23 or the like. An inner face 24 of the thrust plate 22 is adapted for engagement with the mechanism 10.

Figure 2:
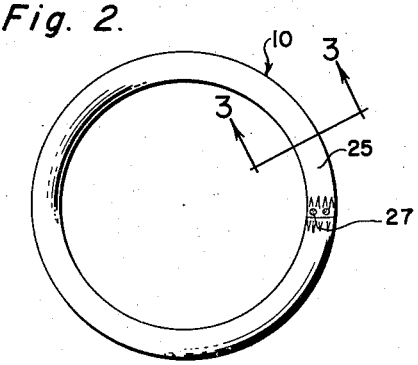
Fig. 2 is a plan view of one form of the present force maintaining mechanism.
Figure 3:
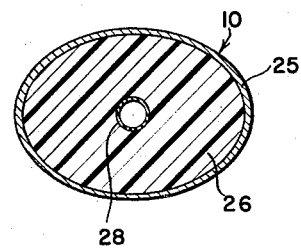
Fig. 3 is an enlarged sectional view through the present mechanism as taken substantially as indicated by line 3—3, Fig. 2.

With reference to Figs. 2 and 3, the mechanism 10 comprises an annular generally toroidal shaped resilient enclosure 25 which may be made from any suitable spring material such as, for example, beryllium copper, some forms of stainless steel, or like material. The enclosure 25 is normally generally elliptical in cross section and serves to confine in an intimate fashion a quantity of a non-newtonian fluid indicated at 26. This non-newtonian fluid may be, for example, a silicon material that is commonly known as "Bouncing Putty" or the like, or may take the form, in certain low temperature applications, of tar or other like substances. The terms "non-newtonian substance" and "non-newtonian fluid" as used herein refer to a material having variable flexible and resilient characteristics that are a function of the rate of application of force thereto—slow application of force to such a material resulting in a flexible fluid flow of the material and little or no resilient effect and permanent deformation thereof and/or until additional force is applied thereto—rapid application of force causing little or no flexible deformation of the material, the material exhibiting high resilient characteristics.

In this particular embodiment of the invention, ends of the enclosure 25 are circumferentially connected as by crimping thereof and spotwelding as at 27. As shown primarily in Fig. 3, means are provided to permit slight compressibility of the material 26, this means comprising a cylindrical tube 28 which may be made from rubber, or the like, in order to confine a quantity of air or an inert gas such as nitrogen, for example.

It may thus be seen that the resilient characteristics of the enclosure 25 serve to maintain a constant force between the thrust plate 22 and the outer race 13 of the bearing 11 and that when shock loading or short duration forces are applied to the bearings, longitudinal movement of the bearings will be resisted by action of the non-newtonian substance 26, inasmuch as substances of this type have an intermolecular shear rate that is inversely proportional to the rate of the force applied thereto. In other words, high resistance to deformation of the encapsulating spring member 25 will be experienced under large short duration forces, and any long duration forces, larger than the spring force of the member 25, as may be imposed by temperature changes, or the like, will cause the spring to deform and the material 26 to flow to such a new volume, or new configuration, that this long duration force can be overcome by the force of the spring. The change in volume of the material 26 within the encapsulating spring is allowed by the tube 28 that may be deformed with relatively little force, as compared to the spring force. The tube 28 and the air entrapped therein has enough restoring force to cause the material 26 to follow any volume or configuration change of the enclosure 25 which defines the encapsulating spring member.

Figure 4:
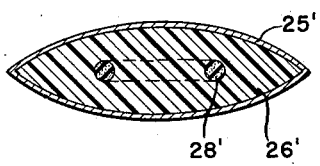
Fig. 4 is a transverse sectional view of a modified form of the present invention.
Figure 4:
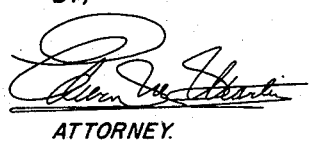

Obviously, the encapsulating spring member or enclosure 25 may be of any desired shape, depending upon particular installational situations and requirements of various applications of the mechanism. For example, as shown in Fig. 4, an enclosure 25' may be made in two integral halves, each half comprising a spherical sector, the resulting structure being equiconvex. The non-newtonian substance 26' is enclosed therein and an annular ring 28' of a resilient material such as, for example, sponge rubber, is disposed within the material 26'.

Figure 5:
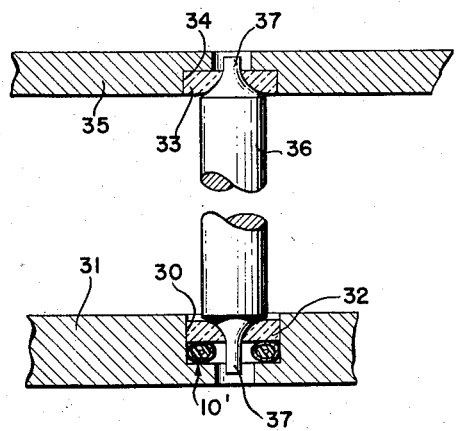
Fig. 5 is a fragmentary sectional view showing another typical use of the present mechanism.

Another application of the present mechanism is shown in Fig. 5 wherein the present mechanism shown at 10' is disposed in a recess 30 of one member 31 and between one end of the recess 30 and a bearing jewel 32. Another jewel 33 is carried in a suitable recess 34 in a second member 35, there being a shaft 36 having needle bearing ends 37 disposed in cooperation with the jewels 32 and 33. The mechanism 10' serves to maintain a constant force between the jewels 32 and 33 and the shaft 36 and resists any shock loading on the shaft.

It is obvious that many further applications may employ the present constant force loading arrangement in connection with bearnigs, or the like. For example, one or more of the present devices may be positioned between adjacently disposed inner or outer races or bearings or may be used in series and disposed in contact with inner or outer races of a plurality of adjacently disposed bearings. Similar applications may be employed in connection with the races of roller bearings or other like structures wherein a specific preloading is required and where a minimum shock force deformation is necessary. Such necessities are commonly encountered in various types of vehicles and wheels thereof, spindle bearings used in metal and woodworking equipment and high performance devices such as precision clocks and the like.

Having thus described the invention and the present embodiments thereof, it is desired to emphasize the fact that many other modifications may be resorted to in a manner limited only by a just interpretation of the following claims:

I claim:

1. A constant force loading arrangement comprising: a resilient enclosure adapted for application of compressive forces thereto; a non-newtonian substance enclosed within said enclosure; and independent means positioned within said enclosure for permitting volumetric changes of said substance.

2. A constant force loading arrangement comprising: an annular generally toroidal resilient enclosure adapted for application of compressive forces thereto; a non-newtonian substance encased within said enclosure; and annular independent means positioned within said enclosure for permitting volumetric changes of said substance.

3. A constant force loading arrangement comprising: an annular, metallic, resilient enclosure adapted for application of compressive forces thereto on opposing sides thereof; a non-newtonian fluid intimately encased within said enclosure; and independent means positioned in said fluid for permitting volumetric changes of said fluid.

4. A constant force loading arrangement comprising: an annular generally toroidal resilient enclosure adapted for application of compressive forces thereto and on opposing sides thereof; a high viscosity non-newtonian fluid intimately encased within said enclosure; and annular independent means positioned in said fluid for permitting volumetric changes of said fluid.

5. A force loading arrangement according to claim 4 wherein said annular independent means comprises a unitary resilient tube having a gas retained therein.

6. A constant force loading arrangement comprising: an integral resilient metallic enclosure formed from opposed spherical sectors and adapted for application of compressive forces thereto and on opposing sides thereof; a high viscosity non-newtonian fluid intimately encased within said enclosure; and annular independent means freely positioned in said fluid for permitting volumetric changes of said fluid.

7. A force loading arrangement according to claim 6 wherein said independent annular means comprises a toroidal ring of sponge material having air spaces therein.

References Cited in the file of this patent

UNITED STATES PATENTS

| 43,316 | Lewis | June 28, 1864 |
| 2,756,016 | Painter | July 24, 1956 |

FOREIGN PATENTS

| 705,296 | Germany | April 23, 1941 |
| 680,108 | Great Britain | Oct. 1, 1952 |
| 1,067,414 | France | Jan. 27, 1954 |